US011853322B2

(12) United States Patent
Barber et al.

(10) Patent No.: US 11,853,322 B2
(45) Date of Patent: Dec. 26, 2023

(54) TRACKING DATA AVAILABILITY USING HEARTBEATS

(71) Applicant: International Business Machines Corporation, Armonk, NY (US)

(72) Inventors: Ronald J. Barber, San Jose, CA (US); Vijayshankar Raman, Cupertino, CA (US); Ronen Grosman, Thornhill (CA); Christian M. Garcia-Arellano, Richmond Hill (CA); Chandrasekaran Mohan, Saratoga, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 16/057,560

(22) Filed: Aug. 7, 2018

(65) Prior Publication Data

US 2020/0050697 A1    Feb. 13, 2020

(51) Int. Cl.
*G06F 16/27* (2019.01)
*G06F 16/2458* (2019.01)

(52) U.S. Cl.
CPC ........ *G06F 16/273* (2019.01); *G06F 16/2477* (2019.01)

(58) Field of Classification Search
CPC . G06F 16/273; G06F 16/2477; G06F 16/2365
See application file for complete search history.

(56) References Cited

U.S. PATENT DOCUMENTS

| 6,820,098 | B1 * | 11/2004 | Ganesh | G06F 11/2074 |
| 6,959,323 | B1 * | 10/2005 | Tzeng | H04L 47/34 |
| | | | | 709/205 |
| 7,546,366 | B2 * | 6/2009 | Vainio | H04L 67/1001 |
| | | | | 370/254 |
| 8,117,156 | B2 | 2/2012 | Krishnaprasad et al. | |
| 8,301,593 | B2 | 10/2012 | Hoffmann et al. | |
| 8,856,593 | B2 | 10/2014 | Eckhardt et al. | |
| 9,569,253 | B1 * | 2/2017 | Hsieh | G06F 16/2379 |
| 9,984,140 | B1 * | 5/2018 | Sukumaran | G06F 16/219 |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Sherief Badawi
*Assistant Examiner* — William P Bartlett
(74) *Attorney, Agent, or Firm* — SHERMAN IP LLP; Kenneth L. Sherman; Hemavathy Perumal

(57) ABSTRACT

One embodiment provides for a method to track replication state and providing quorum visible retrievals. The method includes assigning, by a writer node performing write operations, a sequence number. The sequence number is replicated with a write operation to other replica nodes in an asynchronous fashion thru a first network channel. On a second network channel, a state of a local system is communicated by sending a latest sequence number available that has been hardened to the other replica nodes. A query is obtained by a reader node, and a sequence number limit is selected. Results up to the sequence number limit are returned.

20 Claims, 8 Drawing Sheets

(56) References Cited

U.S. PATENT DOCUMENTS

| | | | |
|---|---|---|---|
| 11,314,717 B1* | 4/2022 | Certain | G06F 16/2308 |
| 2004/0078637 A1* | 4/2004 | Fellin | G06F 11/2082 |
| | | | 714/6.3 |
| 2007/0083521 A1* | 4/2007 | Diedrich | H04L 67/1095 |
| 2011/0178984 A1 | 7/2011 | Talius et al. | |
| 2013/0311488 A1* | 11/2013 | Erdogan | G06F 16/2322 |
| | | | 707/752 |
| 2014/0047263 A1* | 2/2014 | Coatney | G06F 11/2092 |
| | | | 711/119 |
| 2015/0046395 A1* | 2/2015 | Rath | G06F 16/273 |
| | | | 707/623 |
| 2015/0106549 A1* | 4/2015 | Brown | G06F 3/0679 |
| | | | 711/103 |
| 2015/0254298 A1* | 9/2015 | Bourbonnais | G06F 16/273 |
| | | | 707/610 |
| 2018/0095845 A1* | 4/2018 | Sanakkayala | H04L 43/10 |

OTHER PUBLICATIONS

Mounine, H.S., et al., "D3-P2P: Managing Distributed and Replicated Database in P2P Environment by Using Quorum System", Journal of Digital Information Management, Dec. 2012, pp. 351-364, vol. 10, No. 6, United States.

Barber, R. et al., "Evolving Databases for New-Gen Big Data Applications," 8th Biennial Conference on Innovative Data Systems Research (CIDR '17), Jan. 8-11, 2017, 8 pages, United States.

* cited by examiner

TRACKING DATA AVAILABILITY USING HEARTBEATS

BACKGROUND

In a distributed system that utilizes replication as a method of guaranteed availability, traditionally synchronous network transmission is used to validate availability with remote nodes. This method of transmission works reasonably well in a continuously available system, but breaks down in a system designed for end-point failures. The breakdown occurs since retry logic is complex and does not generally leverage the probable batching of requests backed up due to outages.

By sending new information to be replicated asynchronously to replica nodes, i.e., nodes where a replica is to be stored, the batching of any request buildup is leveraged. But then a system remains with the challenge of determining if the data is available on a sufficient number of replica nodes.

SUMMARY

Embodiments relate to track replication state and providing quorum visible retrievals (e.g., in a multi-master distributed data management system). One embodiment provides for a method to track replication state and providing quorum visible retrievals. The method includes assigning, by a writer node performing write operations, a sequence number. The sequence number is replicated with a write operation to other replica nodes in an asynchronous fashion thru a first network channel. On a second network channel, a state of a local system is communicated by sending a latest sequence number available that has been hardened to the other replica nodes. A query is obtained by a reader node, and a sequence number limit is selected. Results up to the sequence number limit are returned.

These and other features, aspects and advantages of the present invention will become understood with reference to the following description, appended claims and accompanying figures.

DETAILED DESCRIPTION

Figure 1:
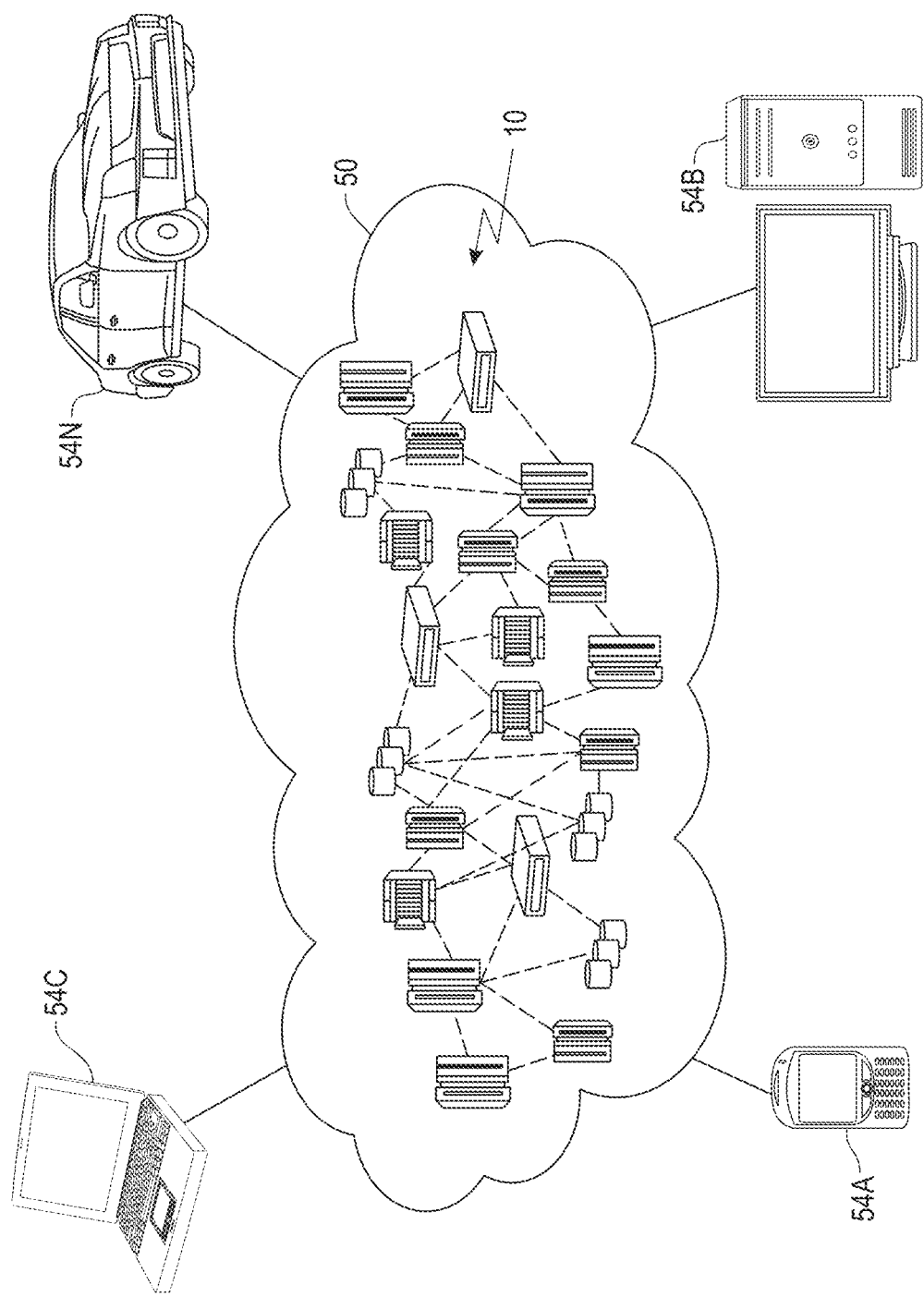
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to tracking replication state and providing quorum visible retrievals of requests (e.g., updates, deletes, inserts, puts, read, fetch, get, etc.) in a system (e.g., a multi-master distributed data management system). One embodiment provides a method to track replication state and providing quorum visible retrievals. The method includes assigning, by a writer node performing write operations, a sequence number. The sequence number is replicated with a write operation to other replica nodes in an asynchronous fashion thru a first network channel. On a second network channel, a state of a local system is communicated by sending a latest sequence number available that has been hardened to the other replica nodes. A query is obtained by a reader node, and a sequence number limit is selected. Results up to the sequence number limit are returned.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
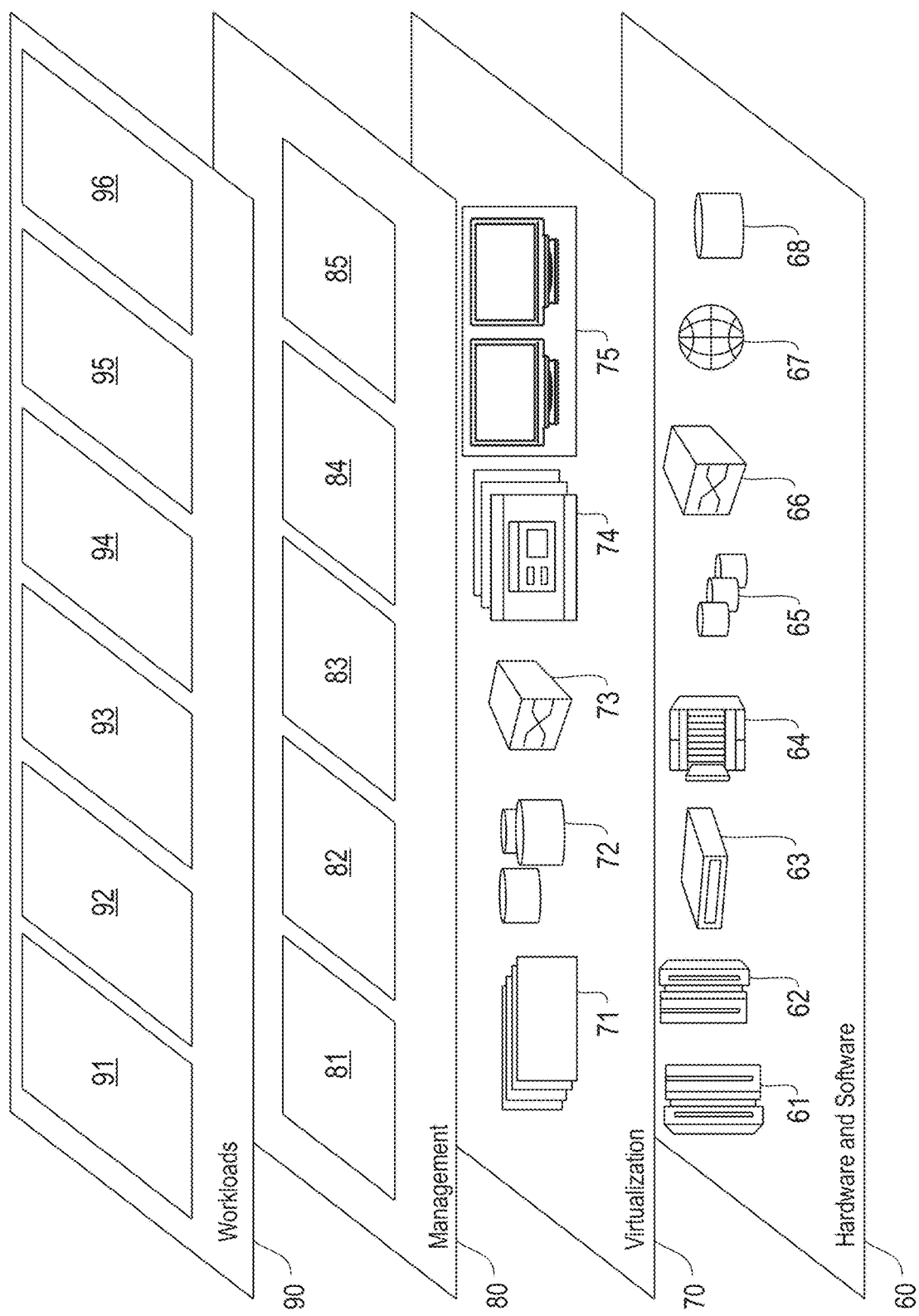
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tracking replication state and providing quorum visible retrievals processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
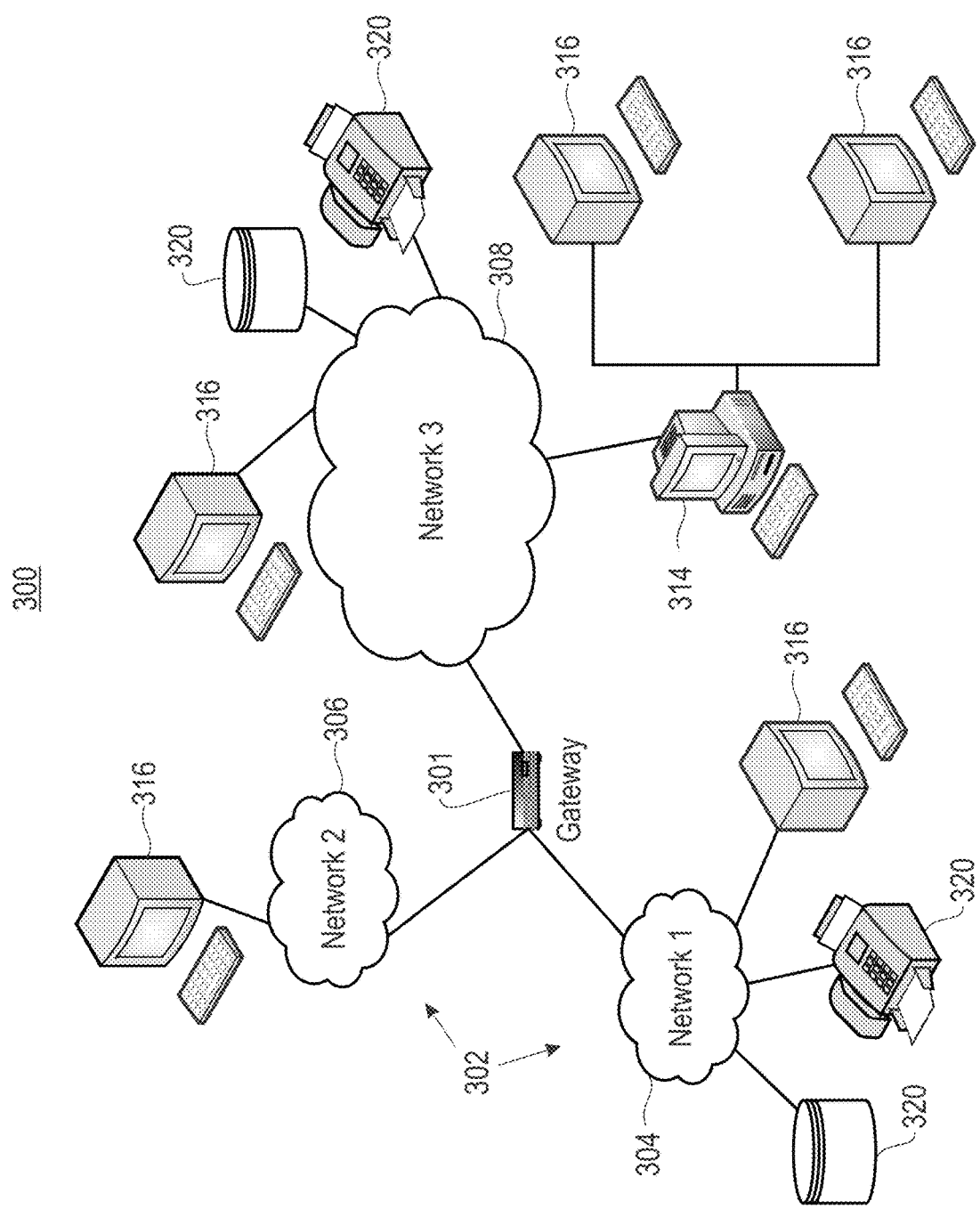
FIG. 3 is a network architecture for a multi-master distributed data management system, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
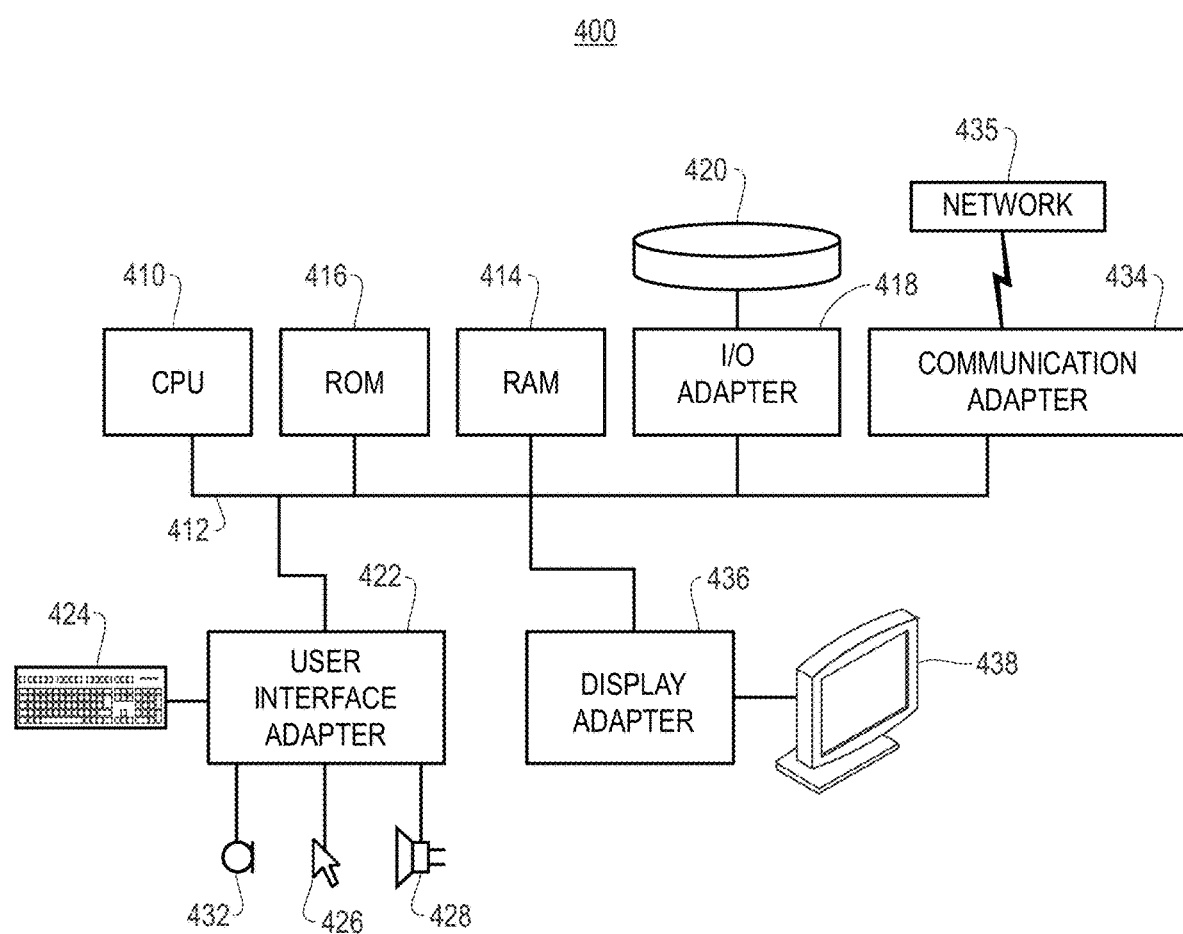
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
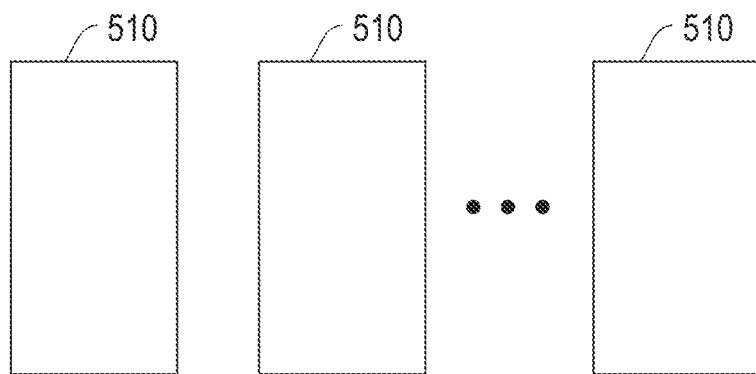
FIG. 5 is a block diagram illustrating a multi-master distributed data management system for performing a process for tracking of heartbeat messages to determine availability of data in a consistent manner, according to one embodiment.
Figure 5:
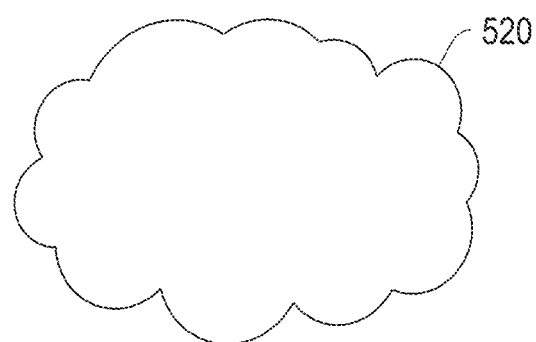
Figure 5:
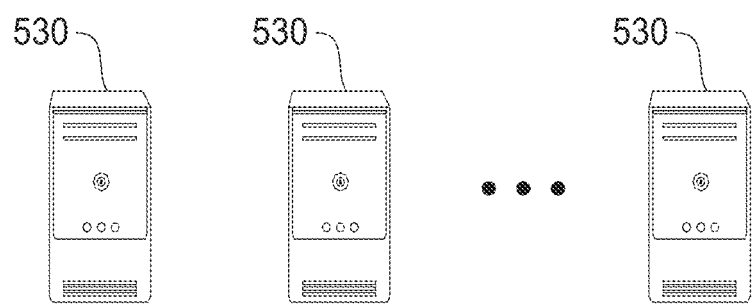

FIG. 5 is a block diagram illustrating a system 500 that may be employed for tracking of heartbeat messages to determine availability of data in a consistent manner, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 does send new information to be replicated asynchronously to replica nodes, and leverages the batching of any request buildup. In one example, each node in a node group stores a replica. The number of replicas is equal to the number of nodes per node group. A replica belongs entirely to a single node (a node can store several replicas). A node may be a physical server with one or more hard-disk drives (e.g., HDDs), solid-state drives (SDDs), etc. A node may also be any other device in a network. System 500 then utilizes careful tracking of heartbeat messages to determine the availability of data in a consistent way. In one embodiment, system 500 sends insert/update/delete/put (i.e., write) type requests to a single node, but these requests are then replicated to other nodes for availability guarantees. Additionally, system 500 sends read/fetch/get (i.e., read) type requests to any replica for load balancing. Thus, system 500 provides a mechanism to determine the replication state, which is of value to both reads and writes. For reads, system 500 enables only accessing data that has been sufficiently hardened (confirmed to be successfully replicated) to the requested level of the read. For writes, system 500 enables the application to know the write request has reached a sufficient level of hardening.

In one embodiment, a strong guarantee may be obtained for reads that request data availability on a number of replicas greater than 50% of the total replicas, which provides guaranteed monotonicity for reads. That is, no matter which replica future reads are sent, they will return all data that is not yet deleted and that had been returned by earlier reads. This processing used in conjunction with writes provides greater than 50% guarantee visibility of the write by all future readers. This type of guarantee is needed by some applications that are dealing with critical data that affects future approval processes, etc.

In one embodiment, while a single writer node and multiple reader nodes are discussed for simplicity, in practice the value comes from multiple writer nodes (i.e., a multi-master system 500) where writes may be sent to any node and need to be distributed to a pre-determined subset of the replica nodes.

Figure 6:
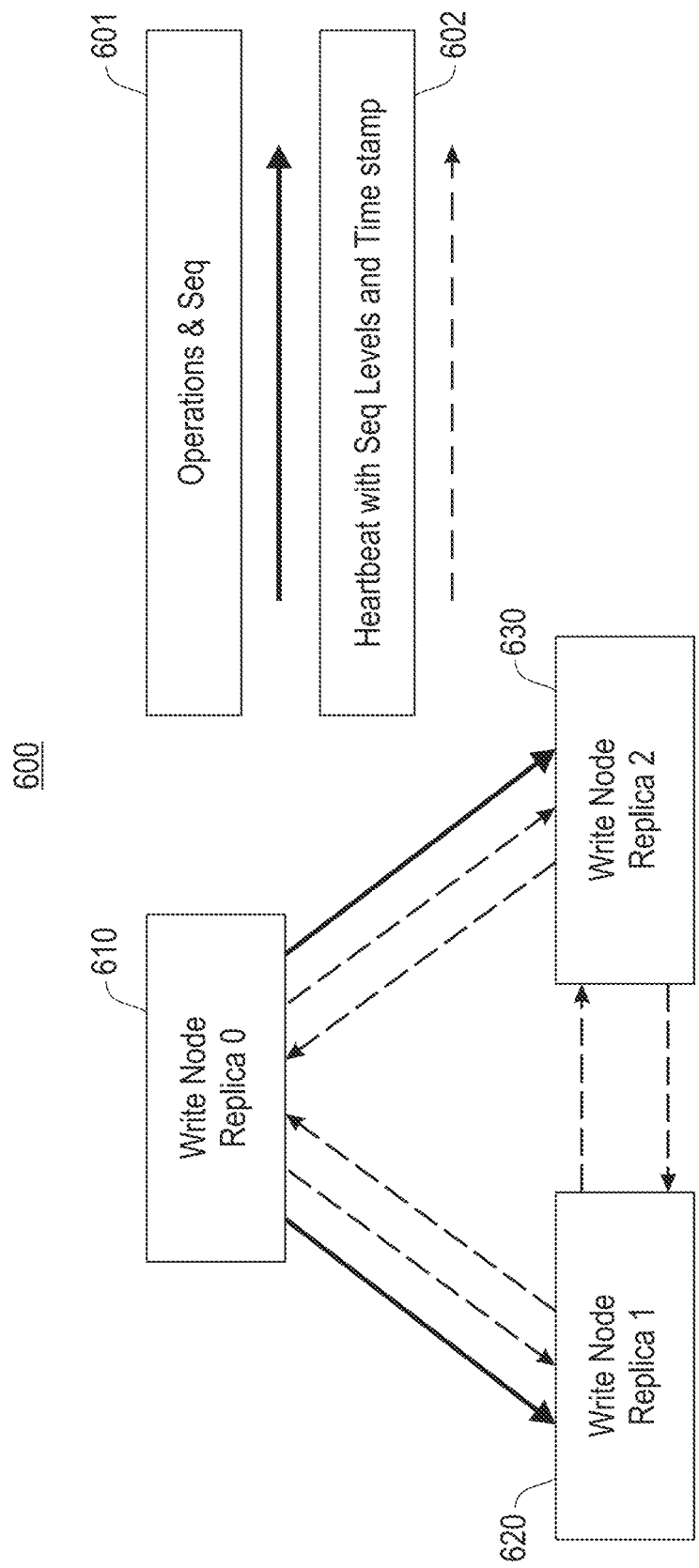
FIG. 6 illustrates a block diagram for an architecture for tracking replication state and providing quorum visible retrievals in system.

FIG. 6 illustrates an example architecture 600 for tracking replication state and providing quorum visible retrievals in system, according to one embodiment. Tracking of heartbeat messages may be used in the architecture 600 to determine availability of data in a consistent manner processing in a system, such as a multi-master distributed data management system, according to one embodiment. In one embodiment, the architecture 600 includes exemplary write nodes 610, 620 and 630. Write node 610 is replica 0, write node 620 is replica 1, and write node 630 is replica 2. Operations and sequence numbers 601 are referenced as solid line arrows. Heartbeats with sequence levels and Time stamp 602 are referenced as dashed arrows. In one embodiment, the node performing writing operations assigns them a sequence number (which may be any strictly increasing number such as a time stamp). This sequence number is replicated with the operation to the other replica nodes in an asynchronous fashion thru a network channel. On a separate channel, the architecture 600 periodically communicates the state of the local system (e.g., system 300, FIG. 3, system 400, FIG. 4, system 500, FIG. 5, etc.) by sending the latest sequence number available that has been hardened to disk (successfully replicated) to the other replicas (this includes the writer node as a replica). This state transmission is referred to as the heartbeat and may also be used to track the nodes health. In one embodiment, the timestamp may be represented as a counter of with a mapping technique to deal with query specified latencies which are likely to be in time units, such as seconds. In some embodiment, to satisfy queries with a specified latency, the timestamp is required to be included in a second network channel.

In one embodiment, each replica (e.g., write node 610 replica 0, write node 620 replica 1, write node 630 replica 2) tracks the time when a heartbeat is received and also its values. In one embodiment, each node optionally stores historical heartbeat values to qualify queries with an older minimum time. In one embodiment, queries allow specification of a minimum timestamp for which they want guaranteed results. In one embodiment, architecture 600 includes an option to assert "now" such that a timestamp is captured when a query was submitted and used for this minimum query time. When capturing time or timestamps, in one embodiment local time is used on the node; though this use is likely to contain a skew for simplicity, which it may be assumed that the skew is small enough to satisfy query requirements. In other embodiments, more sophisticated clock synchronization techniques may be used to maintain a consistent time between the replication nodes.

In one embodiment, as an alternative to using the receive time for heartbeats, a local time may be sent to remote systems on a heartbeat and then have the remote system send back the latest time it heard from this node when it sends a heartbeat to this node. This processing provides each node time consistency on receipts at the cost of the latency of an extra heartbeat.

In one embodiment, the sequence number that has been hardened may actually be a set of numbers if different levels of hardening are desired to be tracked, such as a sequence number of operations that have arrived in memory versus submitted write to disk versus acknowledged hardened to disk. In one embodiment, for simplicity the communications mechanism used to send operations with their sequence numbers is described herein as having a guaranteed order of arrival; though the processing works without that restriction as well via its retry logic. In one embodiment, more sophisticated policies may be supported, such as written on at least two disks or in four nodes of memory. Further, if classes of nodes are available then in one embodiment the architecture 600 has written to disk on two class A or better nodes or on disk on three class B or better nodes, etc.

In one embodiment, for read requests: replicas are denoted as R (including a coordinating node), and requested nodes are denoted as N. Data Sync Level is denoted as L and requested query time is referred to as Min Query Time. In one embodiment, the best guaranteed results is (highest sequence level) what the worst (R−N+1) nodes have knowledge about (lowest sequence level). Other alternative schemes that require less than (R−N+1) are known as long as they guaranteed an intersect in the set of nodes. In one embodiment, for the guarantee: nothing more than L was known by at least N nodes earlier than the Min Query Time.

In one embodiment, the architecture 600 processes read requests as follows. (1) Wait for heartbeat responses from at least (R−N+1) nodes after Min Query Time (may include self). In one example embodiment, the nodes (e.g., write node 610 replica 0, write node 620 replica 1, write node 630 replica 2) would generally maintain several cached heartbeat responses, e.g., every 100 ms going back 1 min. If the Min Query Time is not too current, then cached heartbeats may be used to satisfy this request and get a better "worst" value for L. (2) Compute L as the Max Sync Level for the worst (R−N+1) nodes with Time>Min Query Time. (3) Wait for L>=$L_{node}$ on N nodes and L>=$L_{this-node}$. If a new heart beat arrives, re-compute L, in case a lower value for L is available.

In one embodiment, for write requests replicas are denoted as R (including writing node), requested nodes are denoted as N, and Data Sync Level is denoted as L (provided by Write Request). In one embodiment, for architecture 600, the guarantee is control returned when at least N nodes have a level of L or higher. In one embodiment, the architecture 600 waits for heartbeat responses and when at least N nodes, which may include the node itself, report L or higher return.

Figure 7:
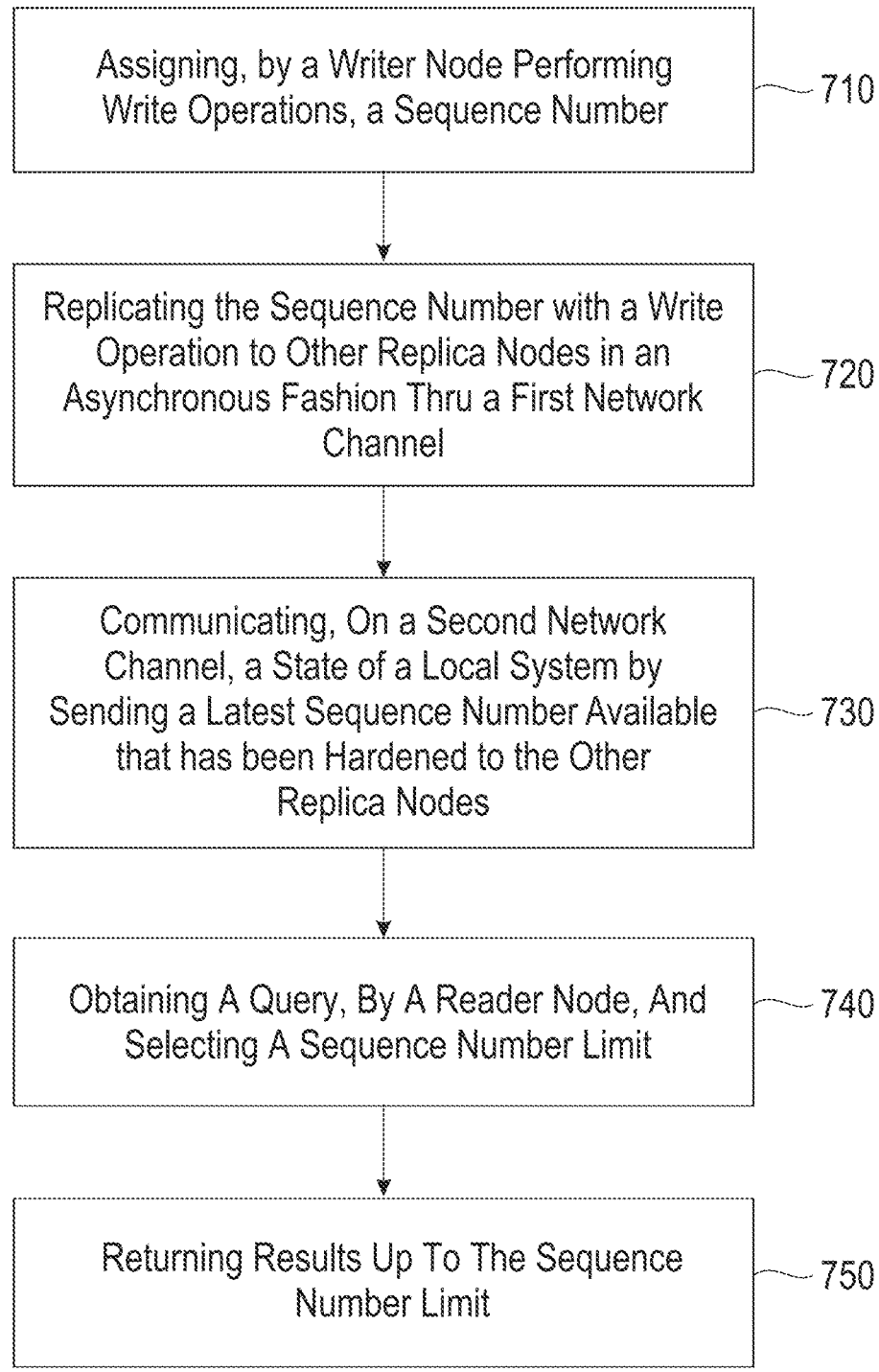
FIG. 7 illustrates a block diagram for a process for tracking replication state and providing quorum visible retrievals, according to one embodiment.

FIG. 7 illustrates a block diagram for process 700 for tracking replication state and providing quorum visible retrievals in system (e.g., a multi-master distributed data management system), according to one embodiment. In one embodiment, in block 710 process 700 assigns, by a writer node performing write operations, a sequence number. In block 720, process 700 replicates the sequence number with a write operation to other replica nodes in an asynchronous fashion thru a first network channel. In block 730, process 700 communicates, on a second network channel, a state of a local system by sending a latest sequence number available that has been hardened to the other replica nodes. In block 740, process 700 obtains a query by a reader node, and selects a sequence number limit. In block 750, process 700 returns results up to the sequence number limit.

In one embodiment, in process 700 the writer node is also sent the latest sequence number available that has been hardened. In process 700 specified reader node queries are sent in conjunction with a data latency requirement that is convertible into a cluster time. In one embodiment, in process 700 specified reader node queries are sent in conjunction with a replication node limit that is used to guarantee result durability.

In one embodiment, in process 700 future queries sent to any node operate on a superset of data seen by prior issuance of queries with same latency and replication specifications. In process 700, the state communication is a heartbeat and is used to track health status of nodes in the local system. In process 700, each replica node tracks a time when a heartbeat is received and the heartbeat values.

In one embodiment, in process 700 each replica node stores historical heartbeat values to qualify queries with an older minimum time. In process 700 the sequence number may be a time stamp.

In process 700, queries may provide specification of a minimum time stamp for which guaranteed results are desired. In process 700, the sequence number may be a strictly increasing number. A particular time stamp may be captured when a query was submitted and the particular time stamp is used for a minimum query time.

Figure 8:
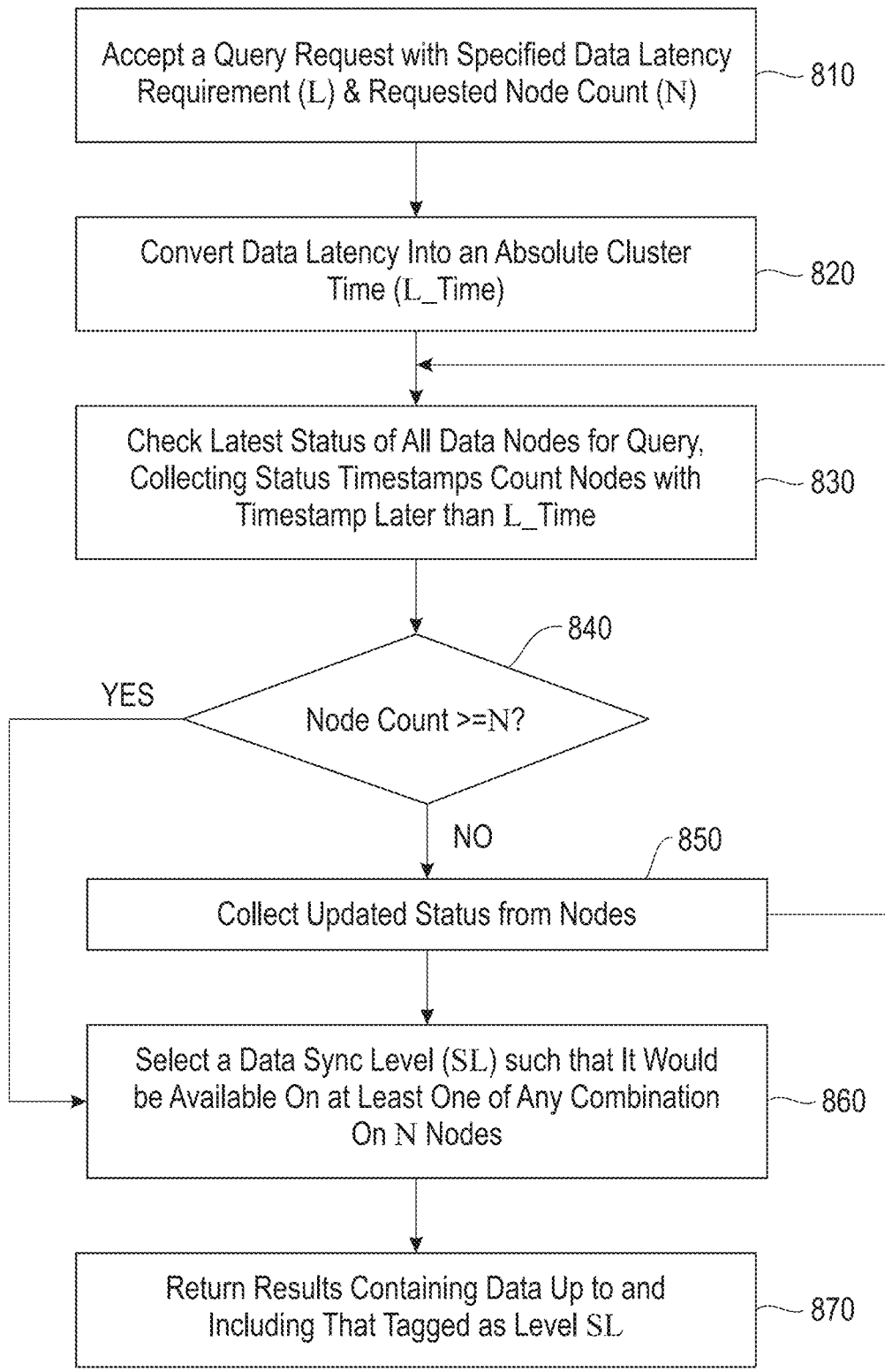
FIG. 8 illustrates a flow diagram for a process for tracking replication state and providing quorum visible retrievals, according to one embodiment.

FIG. 8 illustrates a flow diagram for a process 800 for tracking replication state and providing quorum visible retrievals, according to one embodiment. In one embodiment, in block 810 process 800 accepts a query request with specified data latency requirement (L) and requested node count (N). In block 820, process 800 converts data latency into an absolute (positive value) cluster time (L_Time). In block 830, process 800 checks the latest status of all data nodes for a query, collecting status timestamps and counts nodes with timestamp later than L_Time. In block 840, process 800 determines whether the node count is greater or equal to N. In one embodiment, if the node count is greater or equal to N, process 800 proceeds to block 860, otherwise process 800 proceeds to block 850.

In one embodiment, in block 860 process 800 selects a data sync level (SL) such that it would be available on at least one of any combination on N nodes. Process 800 then proceeds to block 870 where process 800 returns results containing data up to and including that tagged as level SL. If it is determined that the node count is not greater or equal to N, in block 850 process 800 collects updated status from the nodes and proceeds back to block 830.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to track replication state and providing quorum visible retrievals in a computing network, the method comprising:
   performing, by a writer node computing device in the computing network executing a computing process, a write operation in a local computing system in the computing network, wherein the write operation includes assigning a sequence number, and the writer node computing device includes a replica node;
   replicating the sequence number with another write operation to one or more other replica nodes in the computing network in an asynchronous fashion through a first network channel in the computing network;
   communicating, on a second network channel in the computing network, a state of the local computing system by transmitting one or more heartbeat messages comprising a set of numbers to each replica node, wherein the set of numbers comprise different additional sequence numbers representing different levels of hardening, and the different additional sequence numbers include a first additional sequence number assigned to operations that arrived in memory, a second additional sequence number assigned to operations that submitted write to a disk, and a third additional sequence number assigned to operations that are acknowledged hardened to the disk;
   caching the one or more heartbeat messages at each replica node;
   obtaining a query operation, by a reader node computing device in the computing network executing another computing process, and selecting a sequence number limit; and
   returning results for the query operation up to the sequence number limit, wherein the results are based on the different additional sequence numbers representing the different levels of hardening included in the one or more heartbeat messages cached at each replica node.

2. The method of claim 1, wherein the local computing system is part of a multi-master distributed data management system, each node in a node group stores a replica of the sequence number, a number of replicas of the sequence number equals a number of replica nodes per node group, each replica node is a node computing device in the computing network, each replica node belongs to a single node, and each node in the node group has multiple replica nodes.

3. The method of claim 2, wherein the query operation is transmitted in the computing network in conjunction with a data latency requirement that is convertible into a cluster time.

4. The method of claim 2, wherein the query operation is transmitted in the computing network in conjunction with a replication node limit that is used to guarantee result durability.

5. The method of claim 4, wherein future query operations sent to any node computing device operate on a superset of data seen by prior issuance of query operations with same latency and replication specifications.

6. The method of claim 2, wherein the state of the local computing system is used as a heartbeat in the computing network and is also used to track health status of node computing devices in the local computing system.

7. The method of claim 6, wherein each replica node tracks a time when the heartbeat is received and heartbeat values.

8. The method of claim 7, wherein each replica node stores a plurality of historical heartbeat values to qualify query operations with an older minimum time, and the sequence number comprises a time stamp.

9. The method of claim 8, further comprising:
using, for read request operation processing, the stored plurality of historical heartbeat values for computing a maximum synchronization level for particular computing nodes having a time value that is greater than a minimum query time upon the minimum query time not being current;
wherein:
the query operations provide specification of a minimum time stamp for which guaranteed results are desired;
the sequence number comprises a strictly increasing number; and
a particular time stamp is captured when the query operation is transmitted and the particular time stamp is used for the minimum query time.

10. A computer program product for tracking replication state and providing quorum visible retrievals in a computing network, the computer program product comprising a non-transitory computer readable storage medium having program instructions embodied therewith, the program instructions executable by a processor to cause the processor to:
perform, by a writer node computing device in the computing network executing a computing process, a write operation in a local computing system in the computing network, wherein the write operation includes assigning a sequence number, and the writer node computing device includes a replica node;
replicate, by the writer node computing device, the sequence number with another write operation to one or more other replica nodes in the computing network in an asynchronous fashion through a first network channel in the computing network;
communicate, by the writer node, a state of the local computing system on a second network channel in the computing network by transmitting one or more heartbeat messages comprising a set of numbers to each replica node, wherein the set of numbers comprise different additional sequence numbers representing different levels of hardening, and the different additional sequence numbers include a first additional sequence number assigned to operations that arrived in memory, a second additional sequence number assigned to operations that submitted write to a disk, and a third additional sequence number assigned to operations that are acknowledged hardened to the disk;
cache the one or more heartbeat messages at each replica node;
obtain a query operation, by a reader node computing device in the computing network executing another computing process, and selecting a sequence number limit; and
return, by the processor, results for the query operation up to the sequence number limit, wherein the results are based on the different additional sequence numbers representing the different levels of hardening included in the one or more heartbeat messages cached at each replica node.

11. The computer program product of claim 10, wherein the local computing system is part of a multi-master distributed data management system, each node in a node group stores a replica of the sequence number, a number of replicas of the sequence number equals a number of replica nodes per node group, each replica node is a node computing device in the computing network, each replica node belongs to a single node, and each node in the node group has multiple replica nodes.

12. The computer program product of claim 11, wherein the query operation is transmitted in the computing network in conjunction with a data latency requirement that is convertible into a cluster time.

13. The computer program product of claim 11, wherein the query operation is transmitted in the computing network in conjunction with a replication node limit that is used to guarantee result durability.

14. The computer program product of claim 13, wherein:
future query operations transmitted to any node computing device operate on a superset of data seen by prior issuance of query operations with same latency and replication specifications;
the state of the local computing system is used as a heartbeat in the computing network and is also used to track health status of node computing devices in the local computing system; and
each replica node tracks a time when the heartbeat is received and heartbeat values.

15. The computer program product of claim 14, wherein each replica node stores a plurality of historical heartbeat values to qualify query operations with an older minimum time, and the sequence number comprises a time stamp.

16. The computer program product of claim 15, wherein:
the query operations provide specification of a minimum time stamp for which guaranteed results are desired, and the sequence number comprises a strictly increasing number.

17. The computer program product of claim 16, wherein:
the processor further causes the processor to:
use, for read request operation processing, the plurality of stored historical heartbeat values for computing a maximum synchronization level for particular computing nodes having a time value that is greater than a minimum query time upon the minimum query time not being current; and
a particular time stamp is captured when the query operation is transmitted and the particular time stamp is used for the minimum query time.

18. An apparatus, operating in a computing network, comprising:
a memory configured to store instructions; and
a processor configured to execute the instructions to:
perform, by a writer node computing device executing a computer process in the computing network, a write operation in a local computing system in the computing network, wherein the write operation includes assigning a sequence number, and the writer node computing device includes a replica node;
replicate the sequence number with another write operation to one or more other replica nodes in the computing network in an asynchronous fashion through a first network channel in the computing network;
communicate, on a second network channel in the computing network, a state of the local computing system by transmitting one or more heartbeat messages comprising a set of numbers to each replica node, wherein the set of numbers comprise different additional sequence numbers representing different levels of hardening, and the different additional sequence numbers include a first additional sequence number assigned to operations that arrived in memory, a second additional sequence number assigned to operations that submitted write to a disk, and a third additional sequence number assigned to operations that are acknowledged hardened to the disk;

cache the one or more heartbeat messages at each replica node;

obtain a query operation, by a reader node computing device in the computing network executing another computing process, and selecting a sequence number limit; and return results for the query operation up to the sequence number limit, wherein the results are based on the different additional sequence numbers representing the different levels of hardening included in the one or more heartbeat messages cached at each replica node.

19. The apparatus of claim 18, wherein:

the local computing system is part of a multi-master distributed data management system;

each node in a node group stores a replica of the sequence number, a number of replicas of the sequence number equals a number of replica nodes per node group, each replica node is a node computing device in the computing network, each replica node belongs to a single node, and each node in the node group has multiple replica nodes;

the query operation is transmitted in the computing network in conjunction with a data latency requirement that is convertible into a cluster time;

the sequence number comprises a strictly increasing number;

the state of the local computing system is used as a heartbeat in the computing network and is also used to track health status of node computing devices in the local computing system; and each replica node tracks a time when the heartbeat is received and heartbeat values.

20. The apparatus of claim 19, wherein:

the processor further configured to execute the instructions to:

store, by each replica node, a plurality of historical heartbeat values to qualify query operations with an older minimum time; and use, for read request operation processing, the plurality of stored historical heartbeat values for computing a maximum synchronization level for particular computing nodes having a time value that is greater than a minimum query time upon the minimum query time not being current;

the query operation is further transmitted in the computing network in conjunction with a replication node limit that is used to guarantee result durability;

the sequence number comprises a time stamp;

future query operations sent to any node computing device operate on a superset of data seen by prior issuance of query operations with same latency and replication specifications;

each replica node stores the historical heartbeat values to qualify query operations with an older minimum time;

the query operations provide specification of a minimum time stamp for which guaranteed results are desired; and a particular time stamp is captured when the query operation is transmitted and the particular time stamp is used for the minimum query time.

\* \* \* \* \*